（12）United States Patent
Noritake

(10) Patent No.: US 11,865,870 B2
(45) Date of Patent: Jan. 9, 2024

(54) TIRE

(71) Applicant: The Yokohama Rubber Co., LTD., Tokyo (JP)

(72) Inventor: Masashi Noritake, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 17/934,081

(22) Filed: Sep. 21, 2022

(65) Prior Publication Data

US 2023/0099341 A1    Mar. 30, 2023

(30) Foreign Application Priority Data

Sep. 28, 2021   (JP) .................................. 2021-158176

(51) Int. Cl.
*B60C 11/03*     (2006.01)
*B60C 11/13*     (2006.01)

(52) U.S. Cl.
CPC ....... *B60C 11/13* (2013.01); *B60C 2011/0346* (2013.01); *B60C 2011/0348* (2013.01); *B60C 2011/0355* (2013.01); *B60C 2011/0372* (2013.01)

(58) Field of Classification Search
CPC ............. B60C 11/03; B60C 2011/0339; B60C 2011/0341; B60C 2011/0346; B60C 2011/0348
See application file for complete search history.

(56) References Cited

U.S. PATENT DOCUMENTS

2020/0376895 A1 * 12/2020 Hamanaka .......... B60C 11/1281

FOREIGN PATENT DOCUMENTS

JP        2007326433 A     12/2007

* cited by examiner

*Primary Examiner* — Cedrick S Williams
(74) *Attorney, Agent, or Firm* — Thorpe North & Western

(57) ABSTRACT

Center land portions of a tire each include a circumferential narrow groove extending in a tire circumferential direction, and a first lateral groove opening to one edge portion of each of the center land portions at one end and connecting to the circumferential narrow groove at the other end, and a second lateral groove opening to the other edge portion of the center land portion at one end and connecting to the circumferential narrow groove at the other end. Further, the circumferential narrow groove has a zigzag shape formed by repeatedly connecting a first long portion, a first short portion, a second long portion, and a second short portion. Furthermore, the first lateral groove connects to the first long portion of the circumferential narrow groove having the zigzag shape, and the second lateral groove connects to the second long portion of the circumferential narrow groove having the zigzag shape.

20 Claims, 13 Drawing Sheets

| | CONVENTIONAL EXAMPLE | EXAMPLE 1 | EXAMPLE 2 | EXAMPLE 3 | EXAMPLE 4 | EXAMPLE 5 | EXAMPLE 6 |
|---|---|---|---|---|---|---|---|
| AMPLITUDE OF ZIGZAG SHAPE OF CIRCUMFERENTIAL NARROW GROOVE | CONSTANT | CONSTANT | CONSTANT | CONSTANT | CONSTANT | CONSTANT | CONSTANT |
| As/Wb2 | 0.19 | 0.19 | 0.19 | 0.19 | 0.15 | 0.11 | 0.05 |
| As1/As2 | - | 1.00 | 1.00 | 1.00 | 1.00 | 1.00 | 1.00 |
| (NUMBER OF WAVES OF CIRCUMFERENTIAL NARROW GROOVE)/(PITCH NUMBER OF LATERAL GROOVE) | 1.0 | 2.0 | 2.0 | 2.0 | 2.0 | 2.0 | 2.0 |
| P1/Wb2 | 0.85 | 0.85 | 0.55 | 1.05 | 0.85 | 0.85 | 0.85 |
| CONNECTION POINT OF LATERAL GROOVE WITH RESPECT TO CIRCUMFERENTIAL NARROW GROOVE | BENT PORTION | LONG PORTION | LONG PORTION | LONG PORTION | LONG PORTION | LONG PORTION | LONG PORTION |
| DL1/Ps | - | 0.25 | 0.25 | 0.25 | 0.25 | 0.25 | 0.25 |
| DL2/Ps | - | 0.25 | 0.25 | 0.25 | 0.25 | 0.25 | 0.25 |
| D21/Wb2 | 0.22 | 0.22 | 0.22 | 0.22 | 0.22 | 0.22 | 0.22 |
| L21/Ps | 0.17 | 0.17 | 0.17 | 0.17 | 0.17 | 0.17 | 0.17 |
| Wg2/Wg1 | 0.86 | 0.86 | 0.86 | 0.86 | 0.86 | 0.86 | 0.86 |
| Wb2/Wb1 | 0.78 | 0.78 | 0.78 | 0.78 | 0.78 | 0.78 | 0.78 |
| Wb3/Wb1 | 0.81 | 0.81 | 0.81 | 0.81 | 0.81 | 0.81 | 0.81 |
| WET BRAKING PERFORMANCE | 100 | 138 | 136 | 140 | 137 | 136 | 135 |
| UNEVEN WEAR RESISTANCE PERFORMANCE | 100 | 115 | 116 | 114 | 116 | 119 | 121 |

FIG. 10

| | EXAMPLE 7 | EXAMPLE 8 | EXAMPLE 9 | EXAMPLE 10 | EXAMPLE 11 |
|---|---|---|---|---|---|
| AMPLITUDE OF ZIGZAG SHAPE OF CIRCUMFERENTIAL NARROW GROOVE | MODULATION | MODULATION | MODULATION | MODULATION | MODULATION |
| As/Wb2 | 0.11 | 0.11 | 0.11 | 0.11 | 0.11 |
| As1/As2 | 0.90 | 0.49 | 0.15 | 0.49 | 0.49 |
| (NUMBER OF WAVES OF CIRCUMFERENTIAL NARROW GROOVE)/(PITCH NUMBER OF LATERAL GROOVE) | 2.0 | 2.0 | 2.0 | 2.0 | 2.0 |
| P1/Wb2 | 0.85 | 0.85 | 0.85 | 0.85 | 0.85 |
| CONNECTION POINT OF LATERAL GROOVE WITH RESPECT TO CIRCUMFERENTIAL NARROW GROOVE | LONG PORTION | LONG PORTION | LONG PORTION | LONG PORTION | LONG PORTION |
| DL1/Ps | 0.25 | 0.25 | 0.25 | 0.20 | 0.09 |
| DL2/Ps | 0.25 | 0.25 | 0.25 | 0.20 | 0.09 |
| D21/Wb2 | 0.22 | 0.22 | 0.22 | 0.26 | 0.31 |
| L21/Ps | 0.17 | 0.17 | 0.17 | 0.17 | 0.17 |
| Wg2/Wg1 | 0.86 | 0.86 | 0.86 | 0.86 | 0.86 |
| Wb2/Wb1 | 0.78 | 0.78 | 0.78 | 0.78 | 0.78 |
| Wb3/Wb1 | 0.81 | 0.81 | 0.81 | 0.81 | 0.81 |
| WET BRAKING PERFORMANCE | 136 | 135 | 134 | 136 | 137 |
| UNEVEN WEAR RESISTANCE PERFORMANCE | 120 | 122 | 125 | 121 | 120 |

FIG. 11A

| | EXAMPLE 12 | EXAMPLE 13 | EXAMPLE 14 | EXAMPLE 15 | EXAMPLE 16 |
|---|---|---|---|---|---|
| AMPLITUDE OF ZIGZAG SHAPE OF CIRCUMFERENTIAL NARROW GROOVE | MODULATION | MODULATION | MODULATION | MODULATION | MODULATION |
| As/Wb2 | 0.11 | 0.11 | 0.11 | 0.11 | 0.11 |
| As1/As2 | 0.49 | 0.49 | 0.49 | 0.49 | 0.49 |
| (NUMBER OF WAVES OF CIRCUMFERENTIAL NARROW GROOVE)/(PITCH NUMBER OF LATERAL GROOVE) | 2.0 | 2.0 | 2.0 | 2.0 | 2.0 |
| P1/Wb2 | 0.85 | 0.85 | 0.85 | 0.85 | 0.85 |
| CONNECTION POINT OF LATERAL GROOVE WITH RESPECT TO CIRCUMFERENTIAL NARROW GROOVE | LONG PORTION | LONG PORTION | LONG PORTION | LONG PORTION | LONG PORTION |
| DL1/Ps | 0.03 | 0.09 | 0.09 | 0.09 | 0.09 |
| DL2/Ps | 0.03 | 0.09 | 0.09 | 0.09 | 0.09 |
| D21/Wb2 | 0.33 | 0.31 | 0.31 | 0.31 | 0.31 |
| L21/Ps | 0.17 | 0.10 | 0.22 | 0.40 | 0.22 |
| Wg2/Wg1 | 0.86 | 0.86 | 0.86 | 0.86 | 0.44 |
| Wb2/Wb1 | 0.78 | 0.78 | 0.78 | 0.78 | 0.77 |
| Wb3/Wb1 | 0.81 | 0.81 | 0.81 | 0.81 | 0.77 |
| WET BRAKING PERFORMANCE | 138 | 136 | 135 | 134 | 135 |
| UNEVEN WEAR RESISTANCE PERFORMANCE | 119 | 122 | 125 | 127 | 130 |

FIG. 11B

CONVENTIONAL EXAMPLE

TIRE

CROSS-REFERENCE TO RELATED APPLICATIONS

This application claims priority pursuant to 35 U.S.C. 119(a) to Japanese Patent Application No. 2021-158176, filed Sep. 28, 2021, the entire contents of which is incorporated herein by reference in its entirety.

TECHNICAL FIELD

The technology relates to a tire and particularly relates to a tire that can provide wet performance and uneven wear resistance performance in a compatible manner.

BACKGROUND ART

To provide wet performance and uneven wear resistance performance of a tire in a compatible manner, a configuration in which a center land portion includes a circumferential narrow groove and narrower lateral grooves has recently been employed. The technology described in Japan Unexamined Patent Publication No. 2007-326433 is a conventional tire employing such a configuration.

SUMMARY

The technology provides a tire that can provide wet performance and uneven wear resistance performance in a compatible manner.

A tire according to an aspect of the technology includes a pair of shoulder main grooves and one or more center main grooves, and a pair of shoulder land portions and two or more center land portions defined and formed by the shoulder main grooves and the center main grooves. At least one center land portion of the center land portions includes a circumferential narrow groove extending in a tire circumferential direction, a first lateral groove opening to one edge portion of the center land portion at one end and connecting to the circumferential narrow groove at the other end, and a second lateral groove opening to the other edge portion of the center land portion at one end and connecting to the circumferential narrow groove at the other end. The circumferential narrow groove has a zigzag shape formed by repeatedly connecting a first long portion, a first short portion, a second long portion, and a second short portion. The first lateral groove connects to the first long portion of the circumferential narrow groove having the zigzag shape, and the second lateral groove connects to the second long portion of the circumferential narrow groove having the zigzag shape.

In the tire according to an aspect of the technology, (1) the center land portion includes the circumferential narrow groove and the lateral grooves, improving drainage properties of the tread portion center region. Further, (2) the circumferential narrow groove has a zigzag shape in which the long portions and the short portions are alternately connected, and the first and second lateral grooves mutually connect to the different long portions from the left and right of the circumferential narrow groove. Accordingly, the circumferential narrow groove includes the short portions having the zigzag shape, each of the short portions being disposed between connection portions of the adjacent lateral grooves. As a result, drainage properties on the road contact surface of the center land portion are improved, and the wet performance of the tire is improved. Additionally, as compared with a configuration where both the first and second lateral grooves connect to one long portion from the left and right and a configuration where the first and second lateral grooves connect to bend points of the circumferential narrow groove having the zigzag shape, the rigidity of the center land portion is ensured and the uneven wear resistance performance of the tire is improved. As described above, the tire has the advantage of providing wet performance and uneven wear resistance performance in a compatible manner.

BRIEF DESCRIPTION OF DRAWINGS

FIG. 10 is a table indicating the results of performance tests of tires according to embodiments of the technology.

FIGS. 11A-11B include a table indicating the results of performance tests of tires according to embodiments of the technology.

DETAILED DESCRIPTION

Embodiments of the technology will be described in detail below with reference to the drawings. Note that the technology is not limited to the embodiments. Additionally, constituents of the embodiments include constituents that are substitutable and are obviously substitutes while maintaining consistency with the embodiments of the technology. Additionally, a plurality of modified examples described in the embodiments can be combined in a discretionary manner within the scope of obviousness to one skilled in the art.

Tire

Figure 1:
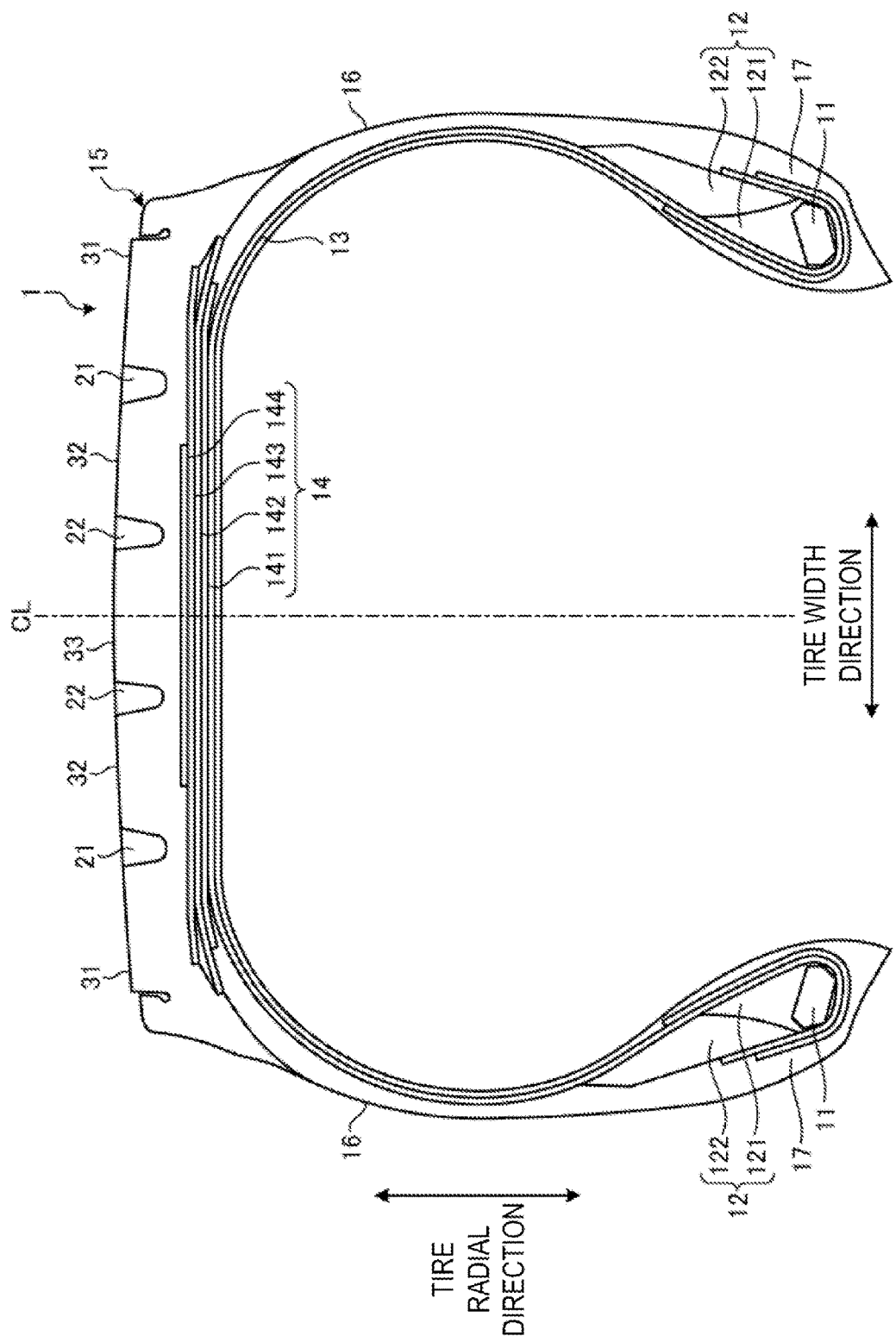
FIG. 1 is a cross-sectional view in a tire meridian direction illustrating a tire according to an embodiment of the technology.

FIG. 1 is a cross-sectional view in a tire meridian direction illustrating a tire 1 according to an embodiment of the technology. The same drawing illustrates a cross-sectional view of a half region in a tire radial direction. In this embodiment, a heavy duty pneumatic radial tire mounted on a long-distance transport vehicle such as a truck or bus will be described as an example of the tire.

In the same drawing, a cross-section in the tire meridian direction is defined as a cross-section of the tire taken along a plane that includes a tire rotation axis (not illustrated). Additionally, a tire equatorial plane CL is defined as a plane that passes through a midpoint of a tire cross-sectional width specified by the Japan Automobile Tyre Manufacturers Association Inc. (JATMA) and that is perpendicular to the tire rotation axis. Additionally, a tire width direction is defined as a direction parallel to the tire rotation axis, and the tire radial direction is defined as a direction perpendicular to the tire rotation axis.

The tire 1 includes an annular structure with the tire rotation axis being as the center, and includes a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 each include one or more of bead wires made of steel and made by being wound annularly multiple times, and the pair of bead cores 11, 11 are embedded in bead portions and constitute cores of the bead portions of left and right. The pair of bead fillers 12, 12 are each made of a lower filler 121 and an upper filler 122. The pair of bead fillers 12, 12 are disposed in outer circumferences in the tire radial direction of the pair of bead cores 11, 11, respectively, and reinforce the bead portions.

The carcass layer 13 includes a single layer structure made of one carcass ply, or a multilayer structure made of a plurality of carcass plies being layered, and the carcass layer 13 extends in a toroidal shape between the bead cores 11, 11 of left and right, and constitutes the backbone of the tire. Additionally, both end portions of the carcass layer 13 are wound and turned back toward an outer side in the tire width direction to wrap the bead cores 11 and the bead fillers 12 and are fixed. Additionally, the carcass ply of the carcass layer 13 is constituted by covering, with coating rubber, a plurality of carcass cords made of steel and by performing a rolling process on the carcass cords. The carcass ply of the carcass layer 13 has a cord angle (defined as an inclination angle in a longitudinal direction of the carcass cords with respect to a tire circumferential direction) of 80 degrees or more and 90 degrees or less as an absolute value for a radial tire and 30 degrees or more and 45 degrees or less for a bias tire.

The belt layer 14 is made of a plurality of belt plies 141 to 144 being layered and is disposed around an outer circumference of the carcass layer 13. The belt plies 141 to 144 include a large-angle belt 141, a pair of cross belts 142, 143, and a belt cover 144. The large-angle belt 141 is constituted by covering, with coating rubber, a plurality of belt cords made of steel and by performing a rolling process on the belt cords. The large-angle belt 141 has a cord angle (defined as an inclination angle in a longitudinal direction of the belt cords with respect to the tire circumferential direction) of 45 degrees or more and 70 degrees or less as an absolute value. The pair of cross belts 142, 143 are each constituted by covering, with coating rubber, a plurality of belt cords made of steel and by performing a rolling process on the belt cords. Each of the pair of cross belts 142, 143 has a cord angle of 10 degrees or more and 55 degrees or less as an absolute value. Additionally, the pair of cross belts 142, 143 have cord angles having mutually opposite signs, and the pair of cross belts 142, 143 are layered by making the belt cords mutually intersect in the longitudinal direction of the belt cords (a so-called crossply structure is formed). The belt cover 144 is constituted by covering, with coating rubber, a plurality of belt cover cords made of steel or an organic fiber material and by performing a rolling process on the belt cover cords. The belt cover 144 has a cord angle of 10 degrees or more and 55 degrees or less as an absolute value.

The tread rubber 15 is disposed on an outer periphery in the tire radial direction of the carcass layer 13 and the belt layer 14 and constitutes a tread portion of the tire 1. The pair of sidewall rubbers 16, 16 are disposed on an outer side in the tire width direction of the carcass layer 13 and constitute sidewall portions of left and right, respectively. The pair of rim cushion rubbers 17, 17 extend from an inner side in the tire radial direction of the bead cores 11, 11 of left and right and turned back portions of the carcass layer 13 toward the outer side in the tire width direction and constitute rim fitting surfaces of the bead portions.

Tread Surface

Figure 2:
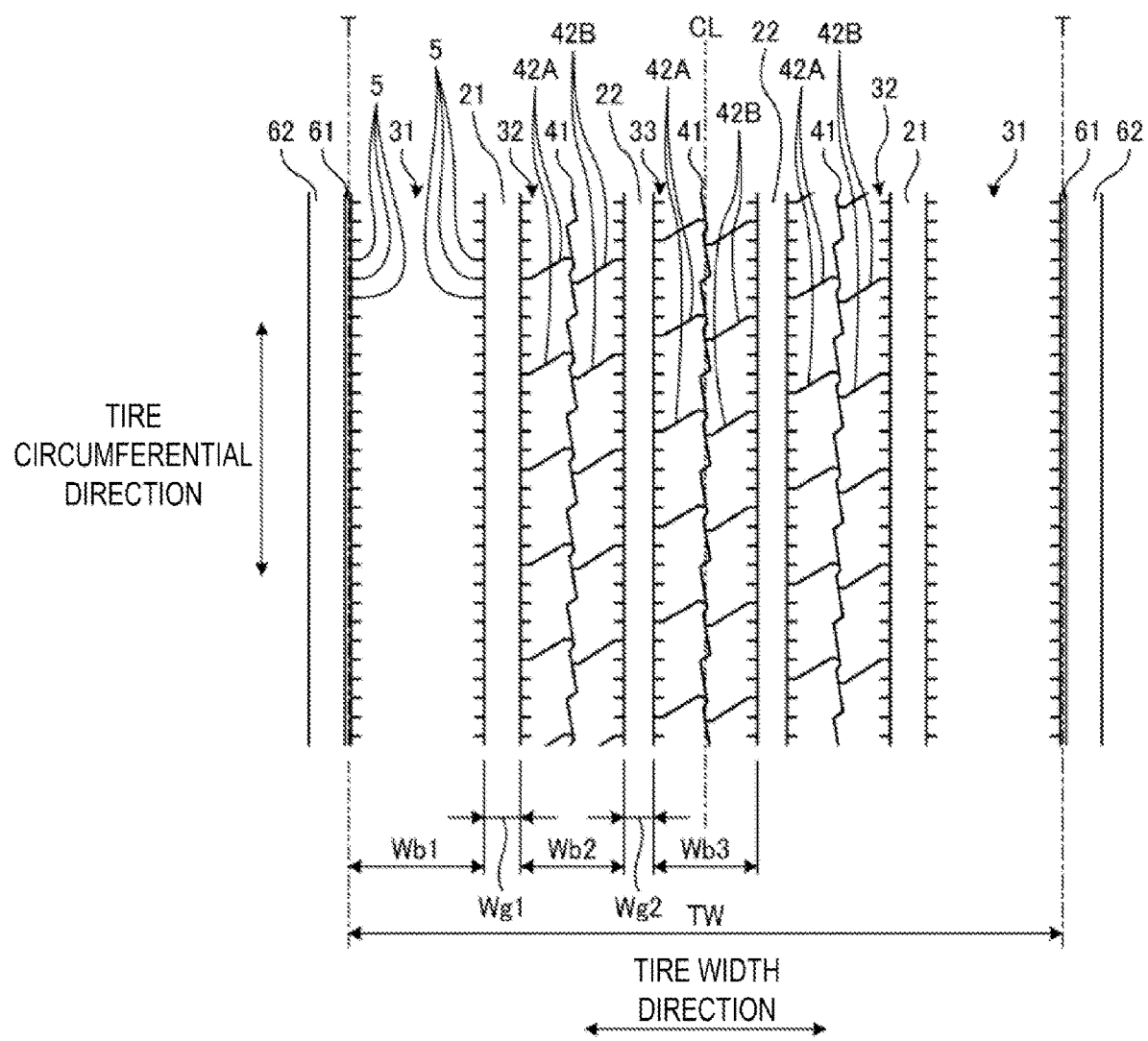
FIG. 2 is a plan view illustrating a tread surface of the tire illustrated in FIG. 1.

FIG. 2 is a plan view illustrating a tread surface of the tire 1 illustrated in FIG. 1. The same drawing illustrates a tread surface of an all-season tire. In the same drawing, "tire circumferential direction" refers to the direction about the tire rotation axis. Additionally, reference sign T denotes a tire ground contact edge, and dimension symbol TW denotes a tire ground contact width.

As illustrated in FIG. 2, the tire 1 includes, in the tread surface, four circumferential main grooves 21, 22 and five land portions 31 to 33.

The circumferential main grooves 21, 22 include a pair of shoulder main grooves 21, 21 and two center main grooves 22, 22. The circumferential main grooves 21, 22 each have an annular structure continuously extending along the entire circumference of the tire. The shoulder main grooves 21, 21 are circumferential main grooves located on the outermost side in the tire width direction of the plurality of circumferential main grooves 21, 22 and are defined respectively by left and right regions between which the tire equatorial plane CL form the boundary. The center main groove 22 is defined as a circumferential main groove further on the tire equatorial plane CL side than the shoulder main groove 21.

"Main groove" refers to a groove on which a wear indicator must be provided as specified by JATMA.

Further, the shoulder main groove 21 has a groove width Wg1 (see FIG. 2) of 8.0 mm or more and 13.0 mm or less and a groove depth Hg1 (see FIG. 7 described below) of 12.0 mm or more and 16.5 mm or less. Furthermore, the center main groove 22 has a groove width Wg2 (see FIG. 2) of 3.5 mm or more and 13.0 mm or less and a groove depth Hg2 (see FIG. 7 described below) of 12.0 mm or more and 16.5 mm or less. Additionally, the groove width Wg2 of the center main groove 22 with the groove width Wg1 of the shoulder main groove 21 is in the range $0.14 \le Wg2/Wg1 \le 1.00$.

The groove width is measured as a maximum value of a distance between opposed groove walls of a groove opening portion on the tread contact surface when the tire is mounted on a specified rim, inflated to a specified internal pressure, and in an unloaded state. In a configuration in which the groove opening portion includes a notch portion or a chamfered portion, the groove width is measured by using, as end points, intersection points of an extension line of a tread contact surface and extension lines of the groove walls, in a cross-sectional view parallel to a groove width direction and a groove depth direction.

The groove depth is measured as the maximum value of a distance from the tread contact surface to the groove bottom when the tire is mounted on a specified rim, inflated to the specified internal pressure, and in an unloaded state. Additionally, in a configuration in which a groove bottom includes partial recess/projection portions or a sipe, the groove depth is measured excluding the partial recess/projection portions or the sipe.

"Specified rim" refers to a "standard rim" defined by JATMA, a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, in the case of a tire for a passenger vehicle, specified internal pressure is an air pressure of 180 kPa, and specified load is 88% of the maximum load capacity at the specified internal pressure.

Also, in the configuration of FIG. 2, a distance (dimension symbol omitted in drawings) from the tire equatorial plane CL to a groove center line of each of the left and right shoulder main grooves 21, 21 is in the range of 26% or more and 32% or less of a tire ground contact width TW.

The groove center line is defined as an imaginary line connecting midpoints of a distance between groove walls opposed to each other.

The tire ground contact width TW is measured as a maximum linear distance in a tire axial direction in a contact surface between the tire and a flat plate when the tire is mounted on a specified rim, inflated to a specified internal pressure, placed perpendicular to the flat plate in a static state, and subjected to a load corresponding to a specified load.

A tire ground contact edge T is defined as the maximum width position in a tire axial direction on the contact surface between the tire and a flat plate when the tire is mounted on a specified rim, inflated to a specified internal pressure, placed perpendicular to the flat plate in a static state, and subjected to a load corresponding to a specified load.

The land portions 31 to 33 include a pair of shoulder land portions 31 and 31 and three center land portions 32, 33, and 32. The land portions 31 to 33 are defined and formed by the circumferential main grooves 21, 22, and each of the land portions forms an annular road contact surface that extends along the entire circumference of the tire. The shoulder land portion 31 is defined as a land portion defined by the shoulder main groove 21 and located on the outer side in the tire width direction. Additionally, the pair of shoulder land portions 31, 31 are disposed in the left and right regions between which the tire equatorial plane CL lies as a boundary. The center land portions 32, 33 are defined as land portions located between the pair of shoulder land portions 31, 31.

Further, in FIG. 2, a ground contact width Wb1 of the shoulder land portion 31 with respect to the tire ground contact width TW is in the range $0.15 \leq Wb1/TW \leq 0.25$ and is preferably in the range $0.18 \leq Wb1/TW \leq 0.22$. Further, a ground contact width Wb2 of the center land portion 32 and a ground contact width Wb3 of the center land portion 33 with respect to the tire ground contact width TW are respectively in the range $0.13 \leq Wb2/TW \leq 0.16$ and in the range $0.13 \leq Wb3/TW \leq 0.16$. Additionally, the ground contact width Wb2 of the center land portion 32 and the ground contact width Wb3 of the center land portion 33 with respect to the ground contact width Wb1 of the shoulder land portion 31 are respectively in the range $0.70 \leq Wb2/Wb1 \leq 0.85$ and in the range $0.70 \leq Wb3/Wb1 \leq 0.85$. In such a configuration, the shoulder land portion 31 has a wide structure, and thus the rigidity of the shoulder land portion 31 is ensured, and uneven wear of the shoulder land portion 31 is effectively suppressed.

The ground contact width of the land portion is measured as a maximum linear distance in the tire axial direction in a contact surface between the land portion and a flat plate when the tire is mounted on a specified rim, inflated to a specified internal pressure, placed perpendicular to the flat plate in a static state, and loaded with a load corresponding to a specified load.

Further, in the configuration of FIG. 2, the tire 1 includes the pair of shoulder main grooves 21, 21 and the two center main grooves 22, 22 as described above, and thus the pair of shoulder land portions 31, 31 and the three center land portions 32, 33 are defined. However, no such limitation is intended, and the tire 1 may include one or three or more center main grooves (not illustrated). In the former configuration, a pair of center land portions are defined, and in the latter configuration, four or more center land portions are defined. Additionally, the center land portion 33 may be disposed on the tire equatorial plane CL (see FIG. 2) or may be disposed at a position away from the tire equatorial plane CL (not illustrated).

Zigzag Shape of Groove Bottom of Main Groove

Further, in the configuration of FIG. 2, the shoulder main groove 21 and the center main groove 22 each include an edge portion having a straight shape in a groove opening portion. Meanwhile, each of the main grooves 21, 22 may have a straight shape in a groove bottom portion or may have a zigzag shape (not illustrated). For example, the groove opening portion of the main groove 21, 22 has a straight shape, and the groove bottom portion has a zigzag shape. Preferably, a groove wall surface of the main groove 21, 22 is formed of a bent surface connecting the groove opening portion and the groove bottom portion (not illustrated). In such a configuration, an inclination angle (a so-called groove wall angle) of the groove wall of the main groove 21, 22 with respect to the tread contact surface varies toward the tire circumferential direction due to the aforementioned bent surface. As a result, drainage properties of the main grooves 21, 22 are improved, and the rigidity of the land portions 31 to 33 is ensured.

Center Land Portion

Figure 3:
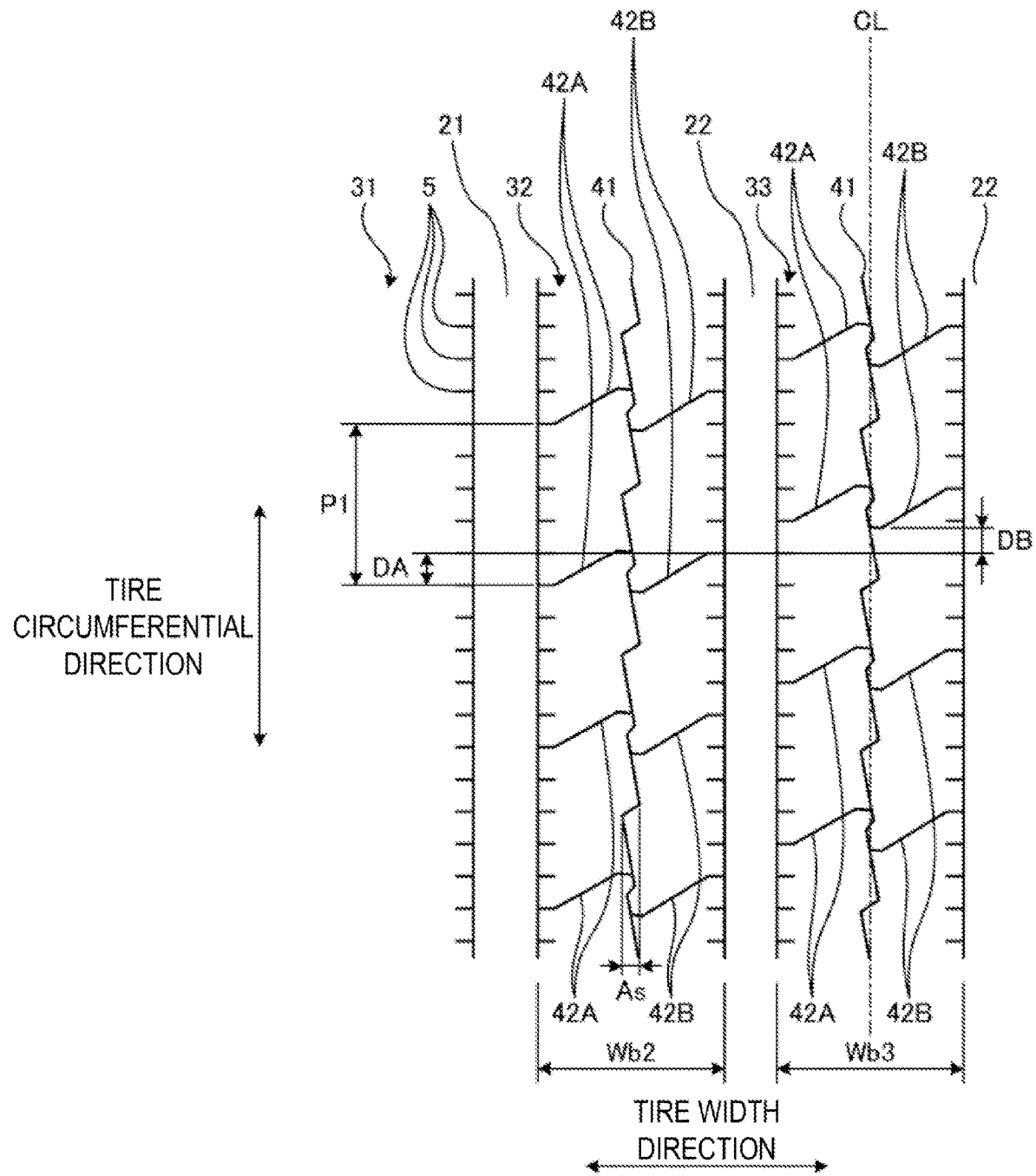
FIG. 3 is an enlarged view illustrating center land portions illustrated in FIG. 2.
Figure 4:
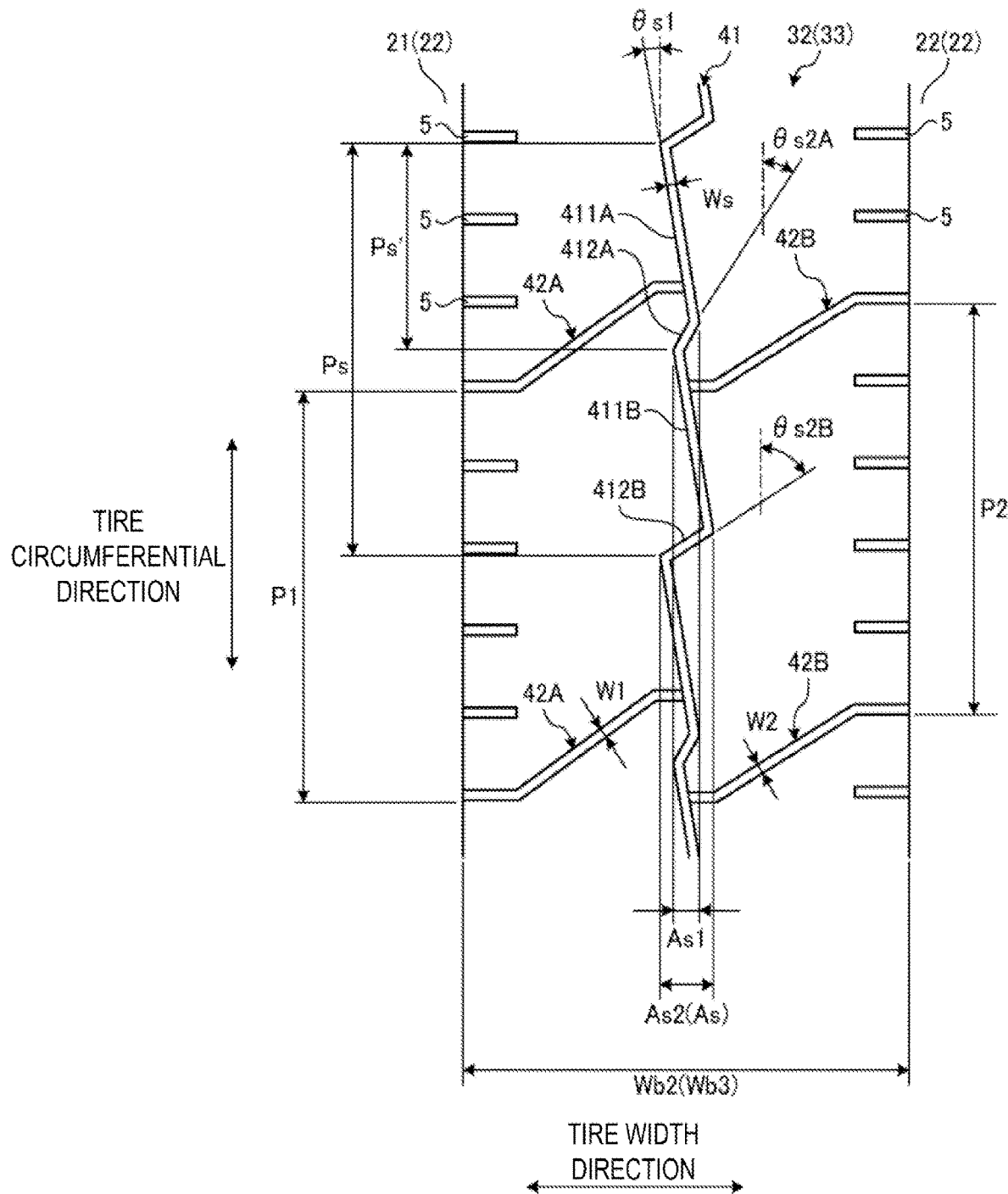
FIG. 4 is an enlarged view illustrating one of the center land portions illustrated in FIG. 3.
Figure 5:
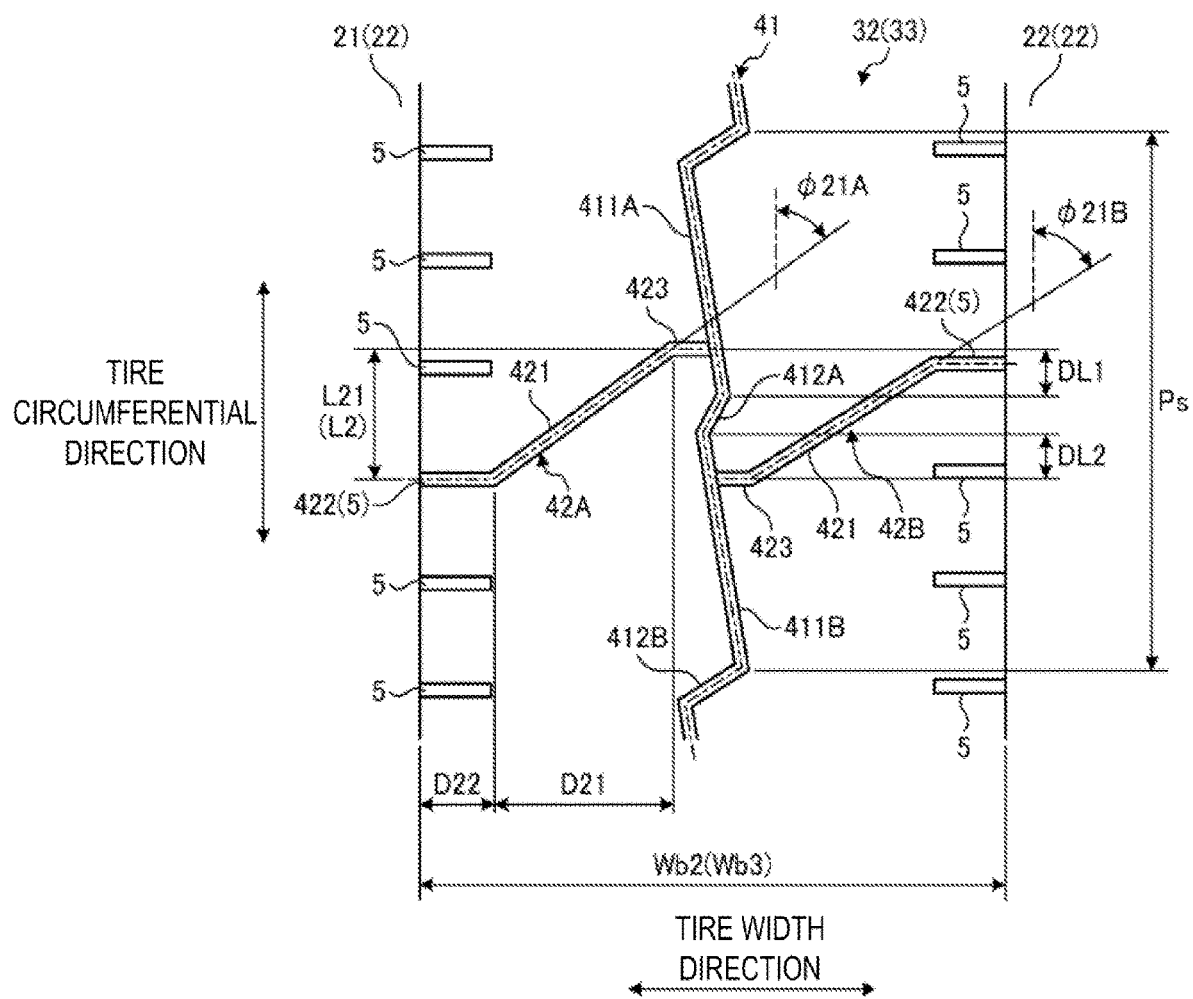
FIG. 5 is an enlarged view illustrating a circumferential narrow groove and lateral grooves of the center land portion illustrated in FIG. 4.
Figure 6:
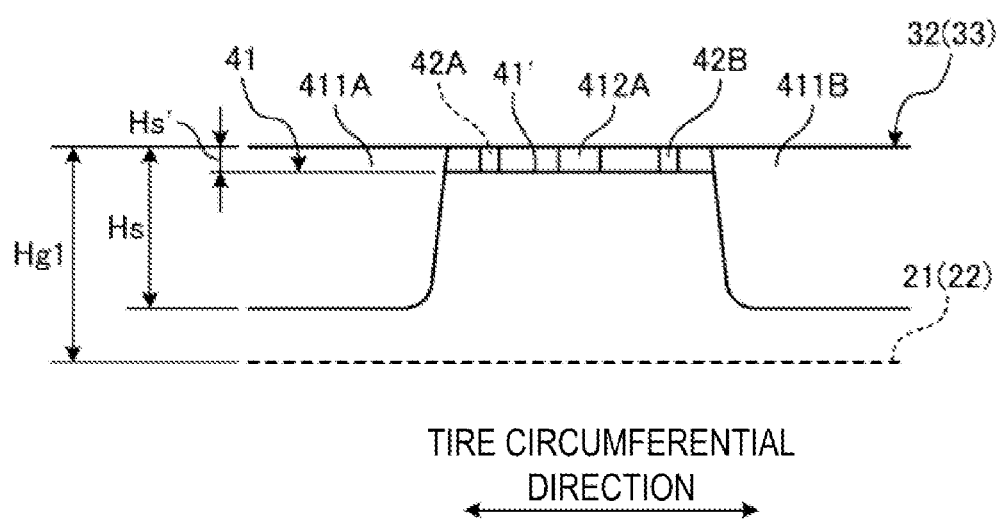
FIG. 6 is a cross-sectional view of the center land portion illustrated in FIG. 4.
Figure 7:
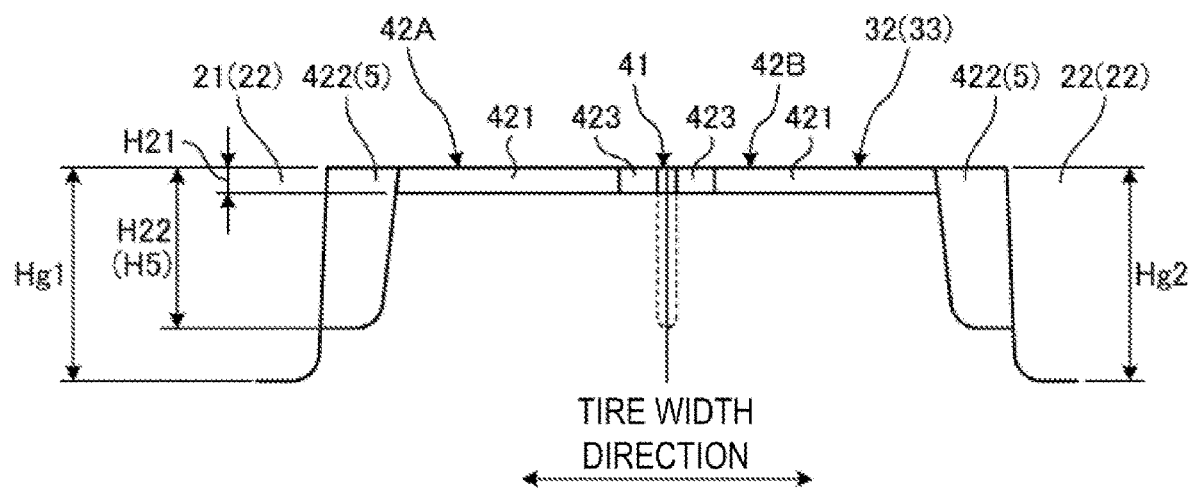
FIG. 7 is a cross-sectional view illustrating the center land portion illustrated in FIG. 4.

FIG. 3 is an enlarged view illustrating the center land portions 32, 33 illustrated in FIG. 2. FIG. 4 is an enlarged view illustrating one center land portion 32 (33) illustrated in FIG. 3. FIG. 5 is an enlarged view illustrating a circumferential narrow groove 41 and lateral grooves 42A, 42B of the center land portion 33 (32) illustrated in FIG. 4. FIGS. 6 and 7 are each a cross-sectional view illustrating the center land portion 32 (33) illustrated in FIG. 4. In these drawings, FIG. 6 illustrates a cross-sectional view along the circumferential narrow groove 41, and FIG. 7 illustrates a cross-sectional view along the lateral grooves 42A, 42B.

As illustrated in FIGS. 2 and 3, the center land portions 32, 33 each include the single circumferential narrow groove 41 and a plurality of lateral grooves 42A, 42B.

As illustrated in FIG. 2, the circumferential narrow groove 41 is a narrow groove that extends in the tire circumferential direction and includes an annular structure continuously extending along the entire circumference of the tire. Further, as illustrated in FIG. 3, a groove center line (not illustrated) of the circumferential narrow groove 41 is disposed in the central portion of the center land portion 32 (33). Specifically, a distance from one edge portion of the center land portion 32 (33) to the groove center line of the circumferential narrow groove 41 with respect to the ground contact width Wb2 (Wb3) of the center land portion 32 (33) is in the range of 30% or more and 70% or less.

Furthermore, in FIG. 4, a groove width Ws of the circumferential narrow groove 41 is in the range $0.1 \text{ mm} \leq Ws \leq 2.0 \text{ mm}$, and is preferably in the range 0.5 mm≤Ws≤1.5 mm. Additionally, in FIG. 6, a groove depth Hs of the circumferential narrow groove 41 with respect to the groove depth Hg1 of the shoulder main groove 21 is in the range 0.05≤Hs/Hg1≤0.80 and is preferably in the range 0.10≤Hs/Hg1≤0.65. With the upper limit described above, drainage properties of the circumferential narrow groove 41 are ensured. With the lower limit described above, a decrease in rigidity of the center land portions 32, 33, which is caused by the arrangement of the circumferential narrow groove 41 is suppressed. Note that the groove width Ws and the groove depth Hs of the circumferential narrow groove 41 may be increased or decreased in a predetermined region as described below (see FIG. 6) or may be constant throughout the entire circumference of the tire (not illustrated).

Further, as illustrated in FIG. 3, the circumferential narrow groove 41 has a zigzag shape formed by alternately connecting long portions and short portions. Furthermore, the long portion and the short portion are inclined in mutually opposite directions with respect to the tire circumferential direction. Additionally, a maximum amplitude As of the zigzag shape with respect to the ground contact width Wb2 of the center land portion 32 is in the range 0.05≤As/Wb2≤0.20 and is preferably in the range 0.10≤As/Wb2≤0.15. With the lower limit described above, the effect of improving drainage properties by the zigzag shape of the circumferential narrow groove 41 is ensured. With the upper limit described above, the rigidity of the center land portions 32, 33 is ensured.

The maximum amplitude As of the zigzag shape is measured as the maximum amplitude of the groove center line of the circumferential narrow groove 41.

For example, in the configuration illustrated in FIG. 4, as illustrated in FIG. 3, the circumferential narrow groove 41 has a zigzag shape formed by repeatedly connecting a first long portion 411A, a first short portion 412A, a second long portions 411B, and a second short portion 412B. Additionally, the first and second long portions 411A, 411B are inclined in one direction with respect to the tire circumferential direction, and the first and second short portions 412A, 412B are inclined in other directions with respect to the tire circumferential direction.

Further, in FIG. 4, an amplitude As1 of the zigzag shape in the first short portion 412A with respect to an amplitude As2 of the zigzag shape in the second short portion 412B is in the range 0.10≤As1/As2≤0.90 and is preferably in the range of 0.40≤As1/As2≤0.60. Accordingly, the zigzag shape has the small amplitude As1 in the first short portion 412A and has the large amplitude As2 (As1<As2) in the second short portion 412B. With the lower limit described above, the effect of improving drainage properties by the first short portion 412A is ensured. With the upper limit described above, the rigidity of the center land portions 32, 33 is ensured. Note that in the configuration of FIG. 4, the amplitude As2 of the zigzag shape in the second short portion 412B corresponds to the maximum amplitude As of the zigzag shape of the circumferential narrow groove 41.

Furthermore, in FIG. 4, a pitch length Ps of the zigzag shape formed of the first long portion 411A, the first short portion 412A, the second long portion 411B, and the second short portion 412B with respect to the ground contact width Wb2 (Wb3) of the center land portion 32 (33) is in the range 0.50≤Ps/Wb2≤1.10 and is preferably in the range of 0.75≤Ps/Wb2≤0.95. With the lower limit described above, the effect of improving drainage properties by the zigzag shape of the circumferential narrow groove 41 is ensured. With the upper limit described above, the rigidity of the center land portions 32, 33 is ensured. Additionally, an extension distance Ps' in the tire circumferential direction of a set of the long portion and the short portion 411A, 412A (411B, 412B) adjacent to each other with respect to the pitch length Ps of the zigzag shape formed of the first long portion 411A, the first short portion 412A, the second long portion 411B, and the second short portion 412B is in the range 0.30≤Ps'/Ps≤0.70 and is preferably in the range 0.40≤Ps'/Ps≤0.60.

The extension distance Ps' in the tire circumferential direction of the first long portion 411A and the first short portion 412A is measured with bend points having the zigzag shape regarded as end points.

Further, in FIG. 4, an inclination angle θs1 of the first and second long portions 411A, 411B with respect to the tire circumferential direction is in the range 3 degrees≤θs1≤17 degrees and is preferably in the range 8 degrees≤θs1≤12 degrees.

The inclination angle is measured as an angle formed by a virtual straight line connected to end points of each of the first and second long portions 411A, 411B, and the tire equatorial plane CL.

Also, an extension length of each of the first and second long portions 411A, 411B in the tire circumferential direction (dimension symbol omitted in the drawings) with respect to the extension distance Ps' in the tire circumferential direction of the aforementioned set of the long portion and the short portion 411A, 412A (411B, 412B) adjacent to each other is in the range of 70% or more and 95% or less and is preferably in the range of 80% or more and 90% or less.

Furthermore, in FIG. 4, an inclination angle θs2A of the first short portion 412A with respect to the tire circumferential direction is preferably in the range 20 degrees≤θs2A≤50 degrees and is preferably in the range 35 degrees≤θs2A≤45 degrees. In addition, an inclination angle θs2B of the second short portion 412B with respect to the tire circumferential direction is preferably in the range 40 degrees≤θs2B≤80 degrees and is preferably in the range 55 degrees≤θs2B≤75 degrees. Also, the inclination angle θs2B of the second short portion 412B with respect to the tire circumferential direction with respect to the inclination angle θs2A of the first short portion 412A is in the range 10 degrees≤θs2B-θs2A≤50 degrees and is preferably in the range 20 degrees≤θs2B-θs2A≤40 degrees. In such a configuration, the inclination angle θs2B of the second short portion 412B having the large amplitude As2 is large, and thus the zigzag shape having the different amplitudes As1 and As2 is formed. Accordingly, the rigidity of the center land portion 32 (33) can be increased in a region having the small amplitude As1 while the effect of improving drainage properties by the zigzag shape is ensured.

Note that the groove width Ws and the groove depth Hs of the circumferential narrow groove 41 may be constant throughout the entire circumference of the tire as described above or may be periodically increased or decreased at a predetermined position. For example, the circumferential narrow groove 41 can have a wide groove width (dimension symbol omitted in the drawings) and a shallow groove depth Hs' (see FIG. 6) in a region including the first short portion 412A having the zigzag shape, more specifically, in a region including a connection point of each of the first and second lateral grooves 42A, 42B described below. Meanwhile, the circumferential narrow groove 41 can have a narrow groove width (dimension symbol omitted in the drawings) and a deep groove depth Hs (see FIG. 6) in a region including the second short portion 412B having the zigzag shape. As a result, the groove volume of the circumferential narrow groove 41 is ensured, and the wet performance of the tire is ensured. In addition, the rigidity of the center land portions 32, 33 is ensured, and uneven wear of the tire is suppressed. In this case, a ratio between the wide groove width and the narrow groove width that are described above is preferably in the range of 1.0 or larger and 2.0 or smaller. Further, the shallow groove depth Hs' described above is realized by the bottom upper portion 41' formed at a groove bottom of the circumferential narrow groove 41. Furthermore, the shallow groove depth Hs' is in the range 0.5 mm≤Hs'≤4.0 mm and is in the range 0.05≤Hs'/Hg1≤0.20 with respect to the groove depth Hg1 of the shoulder main groove 21.

As illustrated in FIG. 3, the plurality of lateral grooves 42A, 42B include the first and second lateral grooves 42A, 42B. The first lateral groove 42A opens to one edge portion of the center land portion 32; 33 (the left side in the drawing) at one end and connects to the circumferential narrow groove 41 at the other end. The second lateral groove 42B opens to the other edge portion of the center land portion 32; 33 (the right side in the drawing) at one end and connects to the circumferential narrow groove 41 at the other end. Also, a set of the lateral grooves 42A, 42B is disposed at the same position in the tire circumferential direction, and a plurality of sets of the lateral grooves 42A, 42B are arranged at predetermined intervals in the tire circumferential direction.

Additionally, in FIG. 4, a pitch length P1 between the first lateral grooves 42A with respect to the ground contact width Wb2 (Wb3) of the center land portion 32 (33) is in the range 0.50≤P1/Wb2≤1.10 and is preferably in the range 0.75≤P1/Wb2≤0.95. With the lower limit described above, the effect of improving drainage properties by the lateral grooves 42A, 42B is ensured. With the upper limit described above, the rigidity of the center land portions 32, 33 is ensured. Note that in the configuration illustrated in FIG. 4, the pitch length P1 between the first lateral grooves 42A is equal to the pitch length Ps of the zigzag shape of the circumferential narrow groove 41. Accordingly, the number of waves having the zigzag shape of the circumferential narrow groove 41 is twice the pitch number of the first lateral groove 42A.

Also, as illustrated in FIG. 4, the first lateral grooves 42A and the second lateral grooves 42B alternately connect to the circumferential narrow groove 41 in the tire circumferential direction. Further, the first and second lateral grooves 42A, 42B respectively connect to the long portions 411A, 411B of the circumferential narrow groove 41 having the zigzag shape. Specifically, as illustrated in FIG. 4, the first lateral groove 42A connects to the first long portion 411A of the circumferential narrow groove 41 having the zigzag shape described above in a T-shape, and the second lateral groove 42B connects to the second long portion 411B in a T-shape. Furthermore, the lateral grooves 42A, 42B adjacent to each other in the tire width direction connect mutually to the different long portions 411A, 411B. Accordingly, one short portion 412A; 412B and a pair of end points thereof (a pair of bend points having the zigzag shape) are disposed between the connection points of the adjacent lateral grooves 42A, 42B. Additionally, a pair of long portions 411A, 411B are disposed between the connection points of the lateral grooves 42A, 42A adjacent in the tire circumferential direction, and a pair of short portions 412A, 412B are disposed between the connection points of the lateral grooves 42B, 42B adjacent in the tire circumferential direction.

In the configuration described above, (1) the circumferential narrow groove 41 has a zigzag shape in which long portions and short portions are alternately connected, and the first and second lateral grooves 42A, 42B connect mutually to the different long portions 411A, 411B from the left and right of the circumferential narrow groove 41. Accordingly, the circumferential narrow groove 41 includes the short portions 412A, 412B having the zigzag shape, each of the short portions being disposed between the connection portions of the adjacent lateral grooves 42A, 42B. As a result, drainage properties on the road contact surfaces of the center land portions 32, 33 are improved, and the wet performance of the tire is improved. Additionally, as compared with a configuration (not illustrated) where both the first and second lateral grooves connect to one long portion from the left and right and a configuration (not illustrated) where the first and second lateral grooves connect to bend points of the circumferential narrow groove having the zigzag shape, the rigidity of the center land portions 32, 33 is ensured, and the concentration of distortion on the edge portion defined by the lateral grooves 42A, 42B is relieved. Thus, uneven wear of the center land portions 32, 33 is suppressed. This provides wet performance and uneven wear resistance performance of the tire in a compatible manner.

Also, as illustrated in FIG. 4, the first and second lateral grooves 42A, 42B are disposed near the first short portion 412A having the small amplitude As1. As a result, as compared with a configuration (not illustrated) where the first and second lateral grooves 42A, 42B each connect to the region near the second short portion 412B having the large amplitude As2, the extension length in the tire width direction of the first and second lateral grooves 42A, 42B is ensured, and drainage properties of the center land portions 32, 33 are improved. Specifically, in FIG. 5, distances DL1, DL2 in the tire circumferential direction from the end points of the first short portion 412A to the connection points of the first and second lateral grooves 42A, 42B with respect to the pitch length Ps of the zigzag shape of the circumferential narrow groove 41 are in the range of 3% or more and 20% or less and are preferably in the range of 5% or more and 15% or less. With the lower limit described above, the rigidity of the center land portions 32, 33 is ensured, and uneven wear of the center land portions 32, 33 is suppressed. With the upper limit described above, the effect of improving drainage properties by the arrangement of the lateral grooves 42A, 42B near the first short portion 412A is ensured.

Further, groove widths W1, W2 of the first and second lateral grooves 42A, 42B are in the range 0.1 mm or more and 2.0 mm or less and are preferably in the range of 0.5 mm or more and 1.5 mm or less. With the lower limit described above, drainage properties of the lateral grooves 42A, 42B are ensured. With the upper limit described above, a decrease in rigidity of the center land portions 32, 33, which is caused by the arrangement of the lateral grooves 42A, 42B is suppressed. Furthermore, the groove widths W1, W2 of the lateral grooves 42A, 42B may be constant entirely along the lateral grooves 42A, 42B as described below, or may be increased or decreased in a predetermined region.

Also, in FIG. 5, each of the first and second lateral grooves 42A, 42B includes an inclined portion 421, an axial direction portion 422, and a connection portion 423.

As illustrated in FIG. 5, the inclined portion 421 is a groove portion inclined at a predetermined inclination angle φ21A, φ21B with respect to the tire circumferential direction, and forms a central portion in a longitudinal direction of each of the lateral grooves 42A, 42B. Further, the inclined portions 421 of the first and second lateral grooves 42A, 42B are inclined in the opposite direction to the long portions 411A, 411B of the circumferential narrow groove 41 having the zigzag shape in the tire circumferential direction. Accordingly, the rigidity balance of the center land portion 32 (33) is ensured. Furthermore, the inclined portions 421 of the first and second lateral grooves 42A, 42B are inclined mutually in the same direction with respect to the tire circumferential direction. In such a configuration, as compared with a configuration (not illustrated) where the first and second lateral grooves are inclined in mutually opposite directions with respect to the tire circumferential direction, the rigidity balance of the center land portion 32 (33) is ensured, and strain energy on the center land portion 32 (33) formed in a rib shape is dispersed. Thus, uneven wear resistance performance is improved. Additionally, the inclination angles φ21A, φ21B of the inclined portions 421 are in the range of 40 degrees or more and 80 degrees or less and are preferably in the range of 50 degrees or more and 70 degrees or less. Moreover, the inclination angles φ21A, φ21B of the inclined portions 421 are substantially equal, and specifically, are in the range of −10 degrees≤φ21A−φ21B≤10 degrees.

Further, the first and second lateral grooves 42A, 42B have the maximum groove widths W1, W2 (see FIG. 4) in the inclined portions 421. Furthermore, a groove depth H21 (FIG. 7) of the inclined portion 421 is in the range 0.5 mm≤H21≤4.0 mm and is in the range 0.05≤H21/Hg1≤0.15 with respect to the groove width Hg1 of the shoulder main groove 21. In such a configuration, since the inclined portion 421 is a wide and shallow groove portion, drainage properties of the lateral grooves 42A, 42B are ensured, and the rigidity of the center land portion 32 (33) is ensured.

Also, in FIG. 5, an extension length D21 in the tire width direction of the inclined portion 421 is in the range 0.10≤D21/Wb2≤0.50 with respect to the ground contact width Wb2 (Wb3) of the center land portion 32 (33) and is preferably in the range of 0.20≤D21/Wb2≤0.45, and is more preferably in the range 0.24≤D21/Wb2≤0.40. With the lower limit described above, the effect of improving drainage properties by the inclined portion 421 is ensured. With the upper limit described above, a space for arranging in the tire width direction the axial direction portion 422 described below is ensured. Thus, uneven wear of the edge portion of the center land portion 32 (33) is suppressed. Further, an extension length L21 in the tire circumferential direction of the inclined portion 421 with respect to the pitch length Ps of the zigzag shape of the circumferential narrow groove 41 is in the range 0.10≤L21/Ps≤0.40 and is preferably in the range 0.20≤L21/Ps≤0.30. With the lower limit described above, the effect of improving drainage properties by the inclined portion 421 is ensured. With the upper limit described above, the rigidity of the center land portion 32 (33) is ensured. Note that in the configuration of FIG. 5, the extension length L21 in the tire circumferential direction of the inclined portion 421 is equal to an extension length L2 in the tire circumferential direction of the lateral grooves 42A, 42B.

Furthermore, in the configuration of FIG. 5, the inclined portion 421 has a straight shape, and thus the lateral grooves 42A, 42B have a Z-shape or a step shape. However, no such limitation is intended. The inclined portion 421 has an arc shape or an S-shape, and thus the lateral grooves 42A, 42B may have a curved shape (not illustrated).

The axial direction portion 422 is a groove portion connecting the inclined portion 421 and the edge portion of the center land portion 32 (33) and extends substantially parallel to the tire rotation axis and connects to the edge portion of the center land portion 32 (33) in a T-shape. Additionally, the inclination angle (dimension symbol omitted in the drawings) of the axial direction portion 422 with respect to the tire circumferential direction is in the range of 80 degrees or more and 110 degrees or less. In such a configuration, since the lateral grooves 42A, 42B connect perpendicular to the edge portion of the center land portion 32 (33), the edge portion of the center land portion 32 (33) is prevented from being damaged from an opening portion of the lateral grooves 42A, 42B.

Further, the groove width (dimension symbol omitted in the drawings) of the axial direction portion 422 is in the range of 0.1 mm or more and 2.0 mm or less, is preferably in the range of 0.5 mm or more and 1.5 mm or less. Furthermore, preferably, the groove width of the axial direction portion 422 is narrower than the groove width of the inclined portion 421 and is in the range of 50% or more and less than 100% with respect to the groove width of the inclined portion 421. Moreover, a groove depth H22 (see FIG. 7) of the axial direction portion 422 is deeper than the groove depth H21 of the inclined portion 421 (H21≤H22) and is in the range 0.60≤H21/Hg1≤0.80 with respect to the groove depth Hg1 of the shoulder main groove 21. For example, in the configuration of FIG. 5, multisipes 5 described below serve as the axial direction portions 422 of the lateral grooves 42A, 42B, and thus the axial direction portions 422 each have a depth equal to that of the multisipes 5. However, no such limitation is intended. The axial direction portion 422 may have the groove depth H21 equal to the depth of the inclined portion 421, and thus the entire lateral grooves 42A, 42B may have a shallow groove structure (not illustrated).

In FIG. 5, an extension length D22 in the tire width direction of the axial direction portion 422 with respect to the ground contact width Wb2 (Wb3) of the center land portion 32 (33) is in the range 0.05≤D22/Wb2≤0.20 and is preferably in the range 0.10≤D22/Wb2≤0.15. Additionally, the extension length D22 of the axial direction portion 422 is in the range 2.0 mm≤D22≤5.0 mm.

The connection portion 423 is a groove portion that connects the inclined portion 421 and the circumferential narrow groove 41. The connection portions 423 respectively connect in a T-shape to the long portions 411A, 411B of the circumferential narrow groove 41 having the zigzag shape. Further, the inclination angle of the connection portion 423 with respect to the tire circumferential direction is in the range of 80 degrees or more and 110 degrees or less.

Furthermore, the groove width (dimension symbol omitted in the drawings) of the connection portion 423 is in the range of 0.1 mm or more and 2.0 mm or less and is preferably in the range 0.5 mm or more and 1.5 mm or less. Additionally, the groove depth (dimension symbol omitted in the drawings, see FIG. 7) of the connection portion 423 has the groove depth H21 equal to that of the inclined portion 421. Accordingly, the lateral grooves 42A, 42B each have a shallow groove depth at the opening portion with respect to the circumferential narrow groove 41.

Also, in FIG. 2, the first center land portion 32 adjacent to one of the pair of shoulder land portions 31, 31 (for example, the shoulder land portion 31 on the left side in the drawing), the second center land portion 33 adjacent to the first center land portion 32, the third center land portion 32 adjacent to the other of the pair of shoulder land portions 31, 31 (for example, the shoulder land portion 31 on the right side in the drawing) are defined. In the configuration of FIG. 2, the first to third center land portions 32, 33, 32 each include the circumferential narrow groove 41 and the first and second lateral grooves 42A, 42B.

In this case, as illustrated in FIG. 3, the first lateral groove 42A and the second lateral groove 42B of the first center land portion 32 are disposed overlapped with each other in the tire circumferential direction. Similarly, the first lateral groove 42A and the second lateral groove 42B of the second center land portion 33 are disposed overlapped with each other in the tire circumferential direction. Additionally, as illustrated in FIG. 2, the first lateral groove 42A and the second lateral groove 42B of the third center land portion 32 are disposed overlapped with each other in the tire circumferential direction.

In the configuration described above, since the first lateral groove 42A and the second lateral groove 42B are disposed overlapped with each other in the tire circumferential direction in each of the first to third center land portions 32, 33, 32, the concentration of distortion on the edge portions defined by the lateral grooves 42A, 42B is relieved. Thus, uneven wear of the center land portions 32, 33 is suppressed as compared with a configuration (not illustrated) where the lateral grooves are disposed offset in the tire circumferential direction.

Moreover, an overlap DA (see FIG. 3) of the first and second lateral grooves 42A and 42B in each of the first to third center land portions 32, 33, 32 with respect to the pitch length P1 (see FIG. 3) between the first lateral grooves 42A is in the range $0.05 \leq DA/P1 \leq 0.40$ and is preferably in the range $0.10 \leq DA/P1 \leq 0.30$. Accordingly, in one center land portion 32; 33, strains of the edge portions of the center land portions 32, 33 due to overlapping of the lateral grooves 42A, 42B with each other are reduced.

The overlap DA between the lateral grooves 42A, 42B is measured as an overlapping distance in the tire circumferential direction between the first and second lateral grooves 42A, 42B when projected onto the tire equatorial plane CL.

Further, as illustrated in FIG. 3, the first and second lateral grooves 42A, 42B of the first center land portion 32 are disposed offset in the tire circumferential direction with respect to the first and second lateral grooves 42A, 42B of the second center land portion 33. Furthermore, as illustrated in FIG. 2, the first and second lateral grooves 42A, 42B of the first center land portion 32, the first and second lateral grooves 42A, 42B of the second center land portion 33, and the first and second lateral grooves 42A, 42B of the third center land portion 32 are disposed mutually offset in the tire circumferential direction.

In the configuration described above, the lateral grooves 42A, 42B of the adjacent center land portions 32, 33; 33, 32 are disposed mutually offset in the tire circumferential direction. Accordingly, as compared with a configuration (not illustrated) where the lateral grooves are disposed overlapped in the tire circumferential direction, periodic resonance caused by the lateral grooves 42A, 42B is canceled, and noise during traveling is reduced.

Further, an offset amount DB (see FIG. 3) between the first and second lateral grooves 42A, 42B of the first center land portion 32 and the first and second lateral grooves 42A, 42B of the second center land portion 33 with respect to the pitch length P1 (see FIG. 3) between the first lateral grooves 42A is in the range $0.10 \leq DB/P1$ and is preferably in the range $0.15 \leq DB/P1$. Accordingly, the noise reduction effect during traveling is ensured by mutual offset of the lateral grooves 42A, 42B of the adjacent center land portions 32, 33. The upper limit of a ratio DB/L2 is not particularly limited but is restricted in relation to the pitch length P1 (see FIG. 3) between the lateral grooves 42A because it is required that a pair of the adjacent lateral grooves 42A, 42B are not overlapped with each other.

The offset amount DB of the lateral grooves 42A, 42B is measured as a separation distance in the tire circumferential direction between the first and second lateral grooves 42A, 42B of the center land portion 32 and the first and second lateral grooves 42A, 42B of the center land portion 33 adjacent to the center land portion 32 when projected onto the tire equatorial plane CL.

Shoulder Land Portion

As illustrated in FIG. 2, the shoulder land portion 31 is a rib having a road contact surface continuous in the tire circumferential direction. Additionally, the shoulder land portion 31 includes only the multisipes 5 and does not include other grooves or sipes. Accordingly, the shoulder land portion 31 includes a plain road contact surface that is not divided in the tire circumferential direction by grooves or sipes. As a result, uneven wear resistance of the shoulder land portion 31 where uneven wear easily occurs can be improved. However, no such limitation is intended, and the shoulder land portion 31 may include shallow sipes or shallow grooves having a depth of 15 mm or less (not illustrated).

Multisipes

In the configuration of FIG. 2, each of the land portions 31 to 33 includes a plurality of multisipes 5. The multisipes 5 are each a short sipe opening to the edge portion of the land portions 31 to 33 at one end and terminating within the land portions 31 to 33 at the other end. The multisipes 5 each have a width of 0.3 mm or more and 1.5 mm or less (dimension symbol omitted in the drawings), a depth H5 (see FIG. 7) of 2.0 mm or more and 17 mm or less, and a length of 2.0 mm or more and 10 mm or less (dimension symbol omitted in the drawings, see FIG. 5). Additionally, the plurality of multisipes 5 are arranged in the tire circumferential direction along the edge portions of the land portions 31 to 33. Further, a pitch length (dimension symbol omitted in the drawings) between the multisipes 5 with respect to the tire circumferential length is in the range of 0.1% or more and 0.6% or less. In such a configuration, the rigidity of the land portions 31 to 33 is reduced by the multisipes 5, and thus ground contact pressure of the edge portions of the land portions 31 to 33 when the tire comes into contact with the ground is reduced. As a result, the occurrence of uneven wear (in particular, river wear) is suppressed, and uneven wear resistance performance of the tire is improved.

Note that, in the configuration of FIG. 2, as illustrated in FIGS. 5 and 7, some of the multisipes 5 serve as the axial direction portions 422 of the lateral grooves 42A, 42B of the center land portions 32, 33. As just described, the lateral grooves 42A, 42B are connected to the multisipes 5 and thus may open to the edge portions of the center land portions 32, 33. In this case, preferably, the multisipes 5 each have a width narrower than the groove widths W1, W2 (see FIG. 4) of the inclined portions 421 of the lateral grooves 42A, 42B and has a depth H5 deeper than the groove depth H21 (see FIG. 7) of the inclined portions 421 of the lateral grooves 42A, 42B. As a result, the drainage function by the lateral grooves 42A, 42B and the effect of suppressing uneven wear by the multisipes 5 are provided in a compatible manner.

Wear Sacrifice Rib

Figure 8:
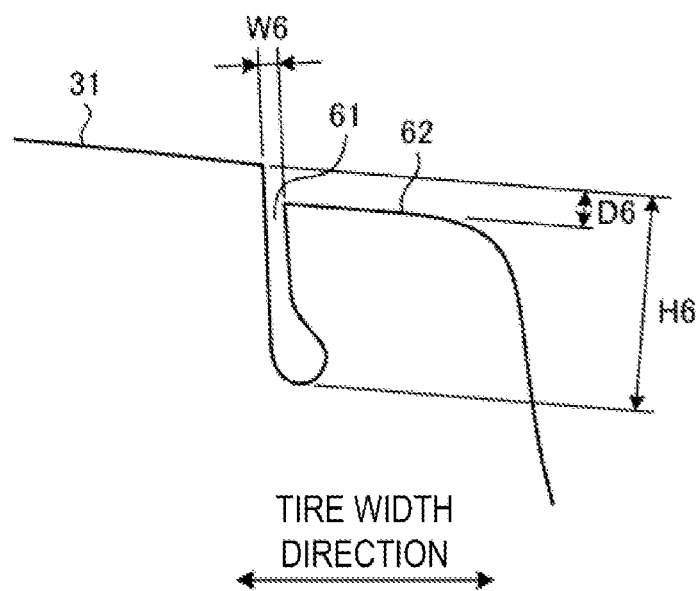
FIG. 8 is a cross-sectional view illustrating an edge portion of a shoulder land portion illustrated in FIG. 2.

FIG. 8 is a cross-sectional view illustrating the edge portion of the shoulder land portion 31 illustrated in FIG. 2.

As illustrated in FIGS. 2 and 8, the shoulder land portion 31 includes a narrow groove 61 that extends along the edge portion on the tire ground contact edge T side, and a narrow rib 62 defined by the narrow groove 61. Additionally, a groove width W6 of the narrow groove 61 is in the range 1.0 mm≤W6≤3.0 mm, and a groove depth H6 of the narrow groove 61 with respect to the groove depth Hg1 of the shoulder main groove 21 (see FIG. 6) is in the range 0.60≤H6/Hg1≤1.00. In such a configuration, the narrow rib 62 functions as a so-called wear sacrifice rib during rolling of the tire and suppresses uneven wear of the body of the shoulder land portion 31. As a result, the uneven wear resistance performance of the tire is improved.

Further, in the configuration of FIG. 8, the narrow groove 61 has a widened portion having a circular cross-section (reference sign omitted in drawings) at the groove bottom. Furthermore, a diameter of the widened portion with respect to the groove width W6 of the narrow groove 61 is in the range of 1.2 times or more and 5 times or less. Additionally, the top surface of the narrow rib 62 is disposed offset in the tire radial direction with respect to the road contact surface of the shoulder land portion 31. Additionally, an offset amount D6 of the top surface of the narrow rib 62 is in the range 1.0 mm≤D6≤4.0 mm. Moreover, the width (dimension symbol omitted in drawings) of the top surface of the narrow rib 62 with respect to the ground contact width Wb1 of the shoulder land portion 31 (see FIG. 2) is in the range of 20% or more and 40% or less. As a result, the effect of suppressing uneven wear by the wear sacrifice rib is improved.

MODIFIED EXAMPLES

Figure 9:
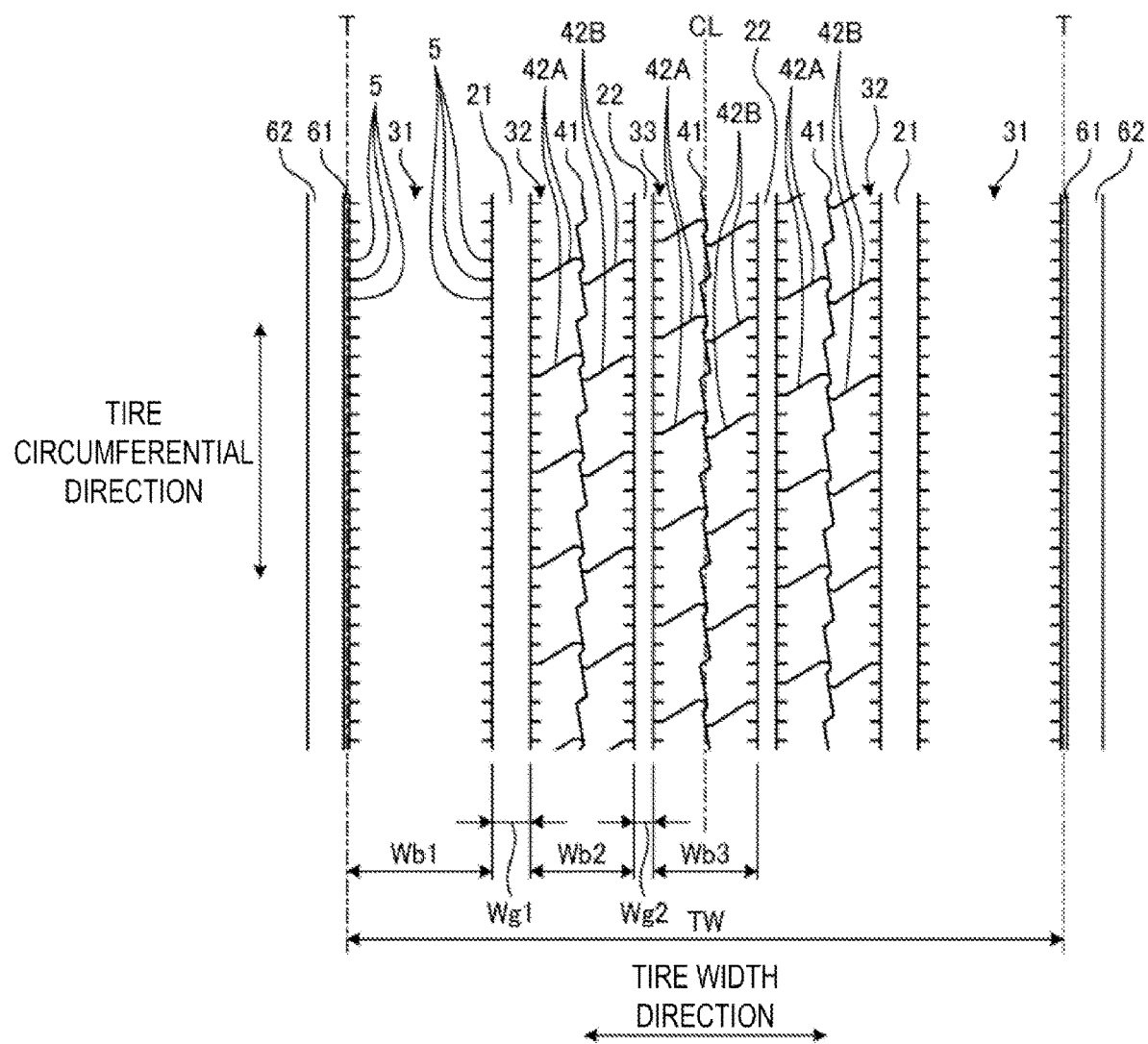
FIG. 9 is a plan view illustrating a modified example of the tire illustrated in FIG. 2.

FIG. 9 is a plan view illustrating a modified example of the tire 1 illustrated in FIG. 2. In the same drawing, constituents identical to those in FIG. 2 have identical reference signs, and descriptions thereof will be omitted.

In the configuration of FIG. 2, the groove width Wg2 of the center main groove 22 is set to be equal to or slightly smaller than the groove width Wg1 of the shoulder main groove 21. Specifically, the groove width Wg2 of the center main groove 22 with respect to the groove width Wg1 of the shoulder main groove 21 is in the range 0.70≤Wg2/Wg1≤1.00 and is preferably in the range 0.80≤Wg2/Wg1≤0.90. Accordingly, the groove width Wg2 of the center main groove 22 is set to be equal to or slightly narrower than the groove width Wg1 of the shoulder main groove 21. As a result, drainage properties of the tread portion center region are ensured. In such a configuration, preferably, the drainage properties of the tread portion center region are improved and thus the wet performance of the tire is improved.

In contrast, in the configuration of FIG. 9, the groove width Wg2 of the center main groove 22 is narrower than the groove width Wg1 of the shoulder main groove 21 and is in the range 0.14≤Wg2/Wg1≤0.45. Additionally, the groove width Wg2 of the center main groove 22 is in the range 3.5 mm≤Wg2≤6.0 mm. In such a configuration, the rigidity of the tread portion center region is increased, and the uneven wear resistance performance of the tire is improved. Also, the rolling resistance performance of the tire is improved.

Effect

As described above, the tire 1 includes a pair of shoulder main grooves 21 and one or more center main grooves 22, and a pair of shoulder land portions 31 and two or more center land portions 32, 33 defined by the shoulder main grooves 21 and the center main grooves 22 (see FIG. 2). Further, at least one of the center land portions 32, 33 includes the circumferential narrow groove 41 extending in the tire circumferential direction, the first lateral grooves 42A each opening to one edge portion of the center land portion 32, 33 at one end and connecting to the circumferential narrow groove 41 at the other end, and the second lateral grooves 42B each opening to the other edge portion of the center land portion 32, 33 at one end and connecting to the circumferential narrow groove 41 at the other end. Furthermore, the circumferential narrow groove 41 has a zigzag shape formed by repeatedly connecting the first long portion 411A, the first short portion 412A, the second long portion 411B, and the second short portion 412B (see FIG. 4). Additionally, the first lateral groove 42A connects to the first long portion 411A of the circumferential narrow groove 41 having the zigzag shape, and the second lateral groove 42B connects to the second long portion 411B of the circumferential narrow groove 41 having the zigzag shape.

In such a configuration, (1) since the center land portions 32, 33 each include the circumferential narrow groove 41 and the lateral grooves 42A, 42B, drainage properties of the tread portion center region are improved. Further, (2) the circumferential narrow groove 41 has a zigzag shape in which the long portions and the short portions are alternately connected, and the first and second lateral grooves 42A, 42B mutually connect to the different long portions 411A, 411B from the left and right of the circumferential narrow groove 41. Accordingly, the circumferential narrow groove 41 includes the short portions 412A, 412B having the zigzag shape, each of the short portions being disposed between the connection portions of the adjacent lateral grooves 42A, 42B. As a result, drainage properties on the road contact surfaces of the center land portions 32, 33 are improved, and the wet performance of the tire is improved. Additionally, as compared with a configuration (not illustrated) where both the first and second lateral grooves connect to one long portion from the left and right and a configuration (not illustrated) where the first and second lateral grooves connect to bend points of the circumferential narrow groove having the zigzag shape, the rigidity of the center land portions 32, 33 is ensured, and the uneven wear resistance performance of the tire is improved. As described above, the tire has the advantage of providing wet performance and uneven wear resistance performance in a compatible manner.

Further, in the tire 1, the groove width Ws (see FIG. 4) of the circumferential narrow groove 41 is in the range 0.1 mm≤Ws≤2.0 mm. There is an advantage that with lower limit described above, drainage properties of the circumferential narrow groove 41 are ensured, and there is an advantage that with the upper limit described above, a decrease in rigidity of the center land portion 32, 33, which is caused by the arrangement of the circumferential narrow groove 41 is suppressed.

Furthermore, in the tire 1, the amplitude As1 of the zigzag shape in the first short portion 412A with respect to the amplitude As2 of the zigzag shape in the second short portion 412B is in the range 0.10≤As1/As2≤0.90 (see FIG. 4). There is an advantage that with the lower limit described above, the effect of improving drainage properties by the first short portion 412A is ensured, and there is an advantage that with the upper limit described above, the rigidity of the center land portions 32, 33 is ensured.

Moreover, in the tire 1, the maximum amplitude As of the zigzag shape with respect to the ground contact width Wb2 (Wb3) of the center land portion 32 (33) is in the range 0.05≤As/Wb2≤0.20 (see FIG. 4). There is an advantage that with the lower limit described above, the effect of improving drainage properties by the zigzag shape of the circumferential narrow groove 41 is ensured, and there is an advantage that with the upper limit described above, the rigidity of the center land portions 32, 33 is ensured.

Further, in the tire 1, the pitch length Ps of the zigzag shape formed of the first long portion 411A, the first short portion 412A, the second long portion 411B, and the second short portion 412B with respect to the ground contact width Wb2 (Wb3) of the center land portion 32 (33) is in the range 0.50≤Ps/Wb2≤1.10 (see FIG. 4). There is an advantage that with the lower limit described above, the effect of improving drainage properties by the zigzag shape of the circumferential narrow groove 41 is ensured, and there is an advantage that with the upper limit described above, the rigidity of the center land portions 32, 33 is ensured.

Furthermore, in the tire 1, the inclination angle θs2B of the second short portion 412B with respect to the tire circumferential direction with respect to the inclination angle θs2A of the first short portion 412A is in the range 10 degrees≤θs2B-θs2A≤50 degrees (see FIG. 4). In such a configuration, the inclination angle θs2B of the second short portion 412B having the large amplitude As2 is large, reducing the extension length in the tire circumferential direction of the second short portion 412B. Accordingly, there is an advantage that the extension lengths in the tire circumferential direction of the first and second short portions 412A, 412B are uniformized.

Additionally, in the tire 1, the groove widths W1, W2 (see FIG. 4) of the first and second lateral grooves 42A, 42B are in the range of 0.1 mm or more and 2.0 mm or less. There is an advantage that with the lower limit described above, drainage properties of the lateral grooves 42A, 42B are ensured, and there is an advantage that with the upper limit described above, a decrease in rigidity of the center land portions 32, 33, which is caused by to the arrangement of the lateral grooves 42A, 42B is suppressed.

Further, in the tire 1, each of the first and second lateral grooves 42A, 42B includes the inclined portion 421 inclined with respect to the tire circumferential direction (see FIG. 5). Furthermore, the inclination angle φ21A, φ21B of the inclined portion 421 is in the range of 40 degrees or more and 80 degrees or less. Additionally, the inclined portions 421 of the first and second lateral grooves 42A, 42B are inclined mutually in the same direction with respect to the tire circumferential direction. In such a configuration, there is an advantage that as compared with a configuration (not illustrated) where the first and second lateral grooves are inclined in mutually opposite directions with respect to the tire circumferential direction, the rigidity balance of the center land portion 32 (33) is ensured, and strain energy on the center land portion 32 (33) formed in a rib shape is dispersed and thus uneven wear resistance performance is improved.

Moreover, in the tire 1, the groove depth H21 of the inclined portion 421 with respect to the groove depth Hg1 of the shoulder main groove 21 is in the range 0.05≤H21/Hg1≤0.15 (see FIG. 7). There is an advantage that with the lower limit described above, drainage properties of the lateral grooves 42A, 42B are ensured, and there is an advantage that with the upper limit described above, the rigidity of the center land portion 32 (33) is ensured.

Further, in the tire 1, the inclined portions 421 of the first and second lateral grooves 42A and 42B are inclined in the opposite direction to the long portions 411A, 411B of the circumferential narrow groove 41 having the zigzag shape (FIG. 5). Accordingly, there is an advantage that the rigidity balance of the center land portion 32 (33) is ensured.

Furthermore, in the tire 1, the extension length D21 in the tire width direction of the inclined portion 421 with respect to the ground contact width Wb2 of the center land portion 32 (33) is in the range 0.10≤D21/Wb2≤0.50 (see FIG. 5).

There is an advantage that with the lower limit described above, the effect of improving drainage properties by the inclined portion 421 is ensured, and there is an advantage that with the upper limit described above, the arrangement space of the axial direction portion 422 in the tire width direction is ensured and uneven wear of the edge portion of the center land portion 32 (33) is suppressed.

Additionally, in the tire 1, each of the first and second lateral grooves 42A, 42B includes the axial direction portion 422 connecting the inclined portion 421 and the edge portion of the center land portion 32 (33) (see FIG. 5). Moreover, the inclination angle (dimension symbol omitted in the drawings) of the axial direction portion 422 with respect to the tire circumferential direction is in the range of 80 degrees or more and 110 degrees or less. In such a configuration, there is an advantage that since the lateral grooves 42A, 42B each connect perpendicularly to the edge portion of the center land portion, a failure of the edge portion of the center land portion 32 (33) from the opening portion of the lateral grooves 42A and 42B is suppressed.

Target of Application

Additionally, the tire 1 is a heavy duty tire mounted on a steering axle of a vehicle. Therefore, by applying the technology to such a heavy duty tire, the effect of improving the tire performances described above is effectively obtained.

Additionally, in the embodiments, a pneumatic tire is described as an example of the tire. However, no such limitation is intended, and the configurations described in the embodiments can also be applied to other tires in a discretionary manner within the scope of obviousness to one skilled in the art. Examples of other tires include an airless tire, and a solid tire.

Examples

Figure 12:
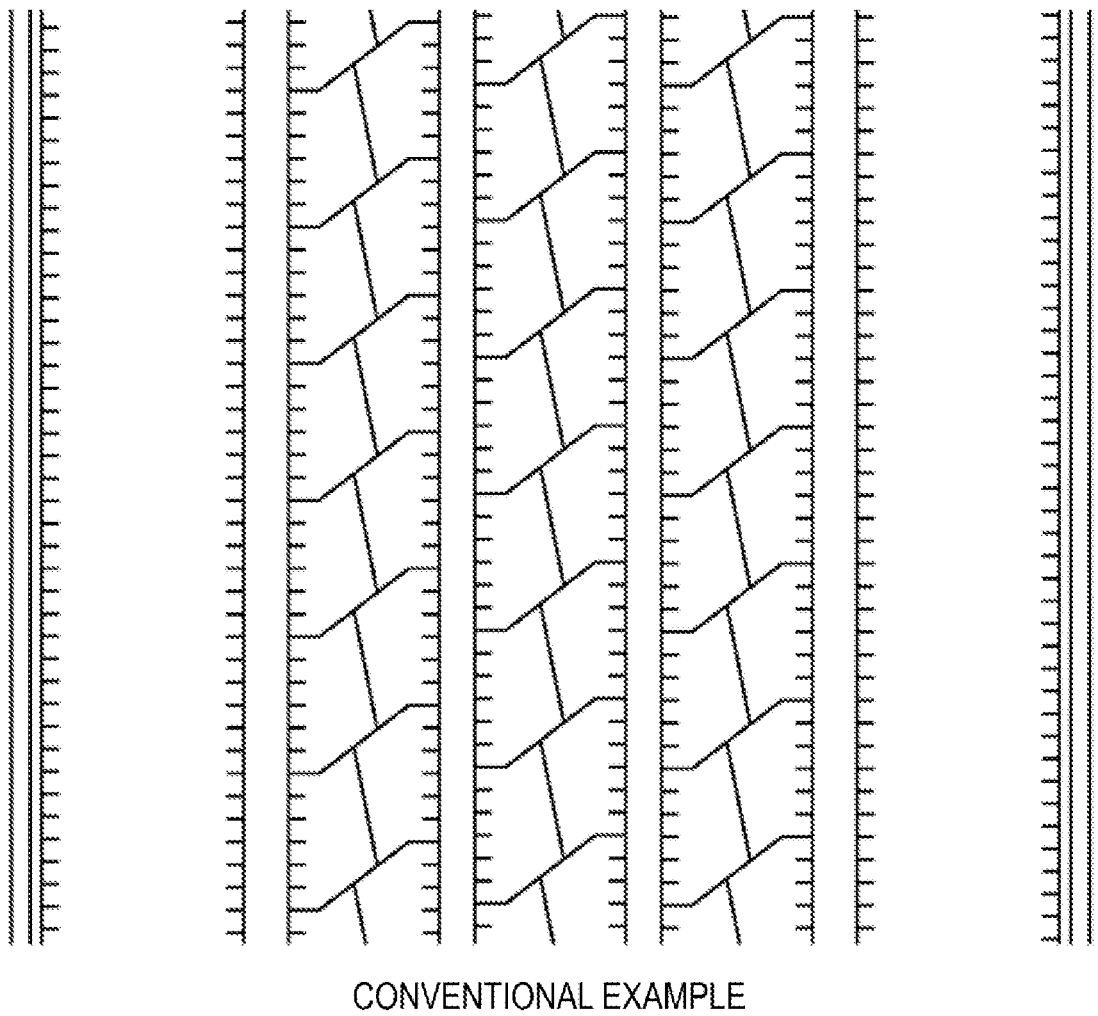
FIG. 12 is a plan view illustrating a tread surface of a tire of Conventional Example.

FIGS. 10-11B are tables indicating the results of performance tests of tires according to embodiments of the technology. FIG. 12 is a plan view illustrating a tread surface of a tire of Conventional Example.

In the performance tests, a plurality of types of test tires were evaluated in terms of (1) wet braking performance and (2) uneven wear resistance performance. Further, test tires having a tire size of 295/75R22.5 are assembled on rims specified by TRA and specified internal pressure and specified load by TRA are applied to the test tires. Furthermore, the test tires are mounted on a 2-D tractor head that is a test vehicle.

In the evaluation of wet braking performance, the test vehicle travels on an asphalt road on which water is sprinkled to a water depth of 1 mm, and a braking distance from an initial speed of 40 km/h is measured. Evaluation was carried out by expressing the measurement results as index values with the results of Conventional Example being defined as the reference (100). In the evaluation, larger values are preferable.

In the evaluation of uneven wear resistance performance, after the test vehicle travels 50,000 km on a predetermined paved road, the depth of step wear of the edge portion of the land portion is observed and is expressed as index values and evaluated. The evaluation is expressed as index values with the value of Conventional Example being assigned the reference (100). In the evaluation, larger values are preferable.

The test tires of Examples 1 to 15 each include the configurations of FIGS. 1 and 2, and each test tire includes four circumferential main grooves 21, 22, a pair of shoulder land portions 31, and three center land portions 32, 33.

Further, all of the center land portions 32, 33 each include the circumferential narrow groove 41 formed by connecting the long portions 411A, 411B and the short portions 412A, 412B, and the lateral grooves 42A, 42B connecting to the long portions 411A, 411B of the circumferential narrow groove 41. Furthermore, the first and second short portions 412A, 412B of the circumferential narrow groove 41 have lengths different from each other. Additionally, the lateral grooves 42A, 42B are arranged in a staggered manner in the tire circumferential direction, and alternately connect to the long portions 411A, 411B of the circumferential narrow groove 41 having a zigzag shape. Further, the groove width Wg1 of the shoulder main groove 21 is 10.5 mm, and the groove depth Hg1 of the shoulder main groove 21 is 14.6 mm. Furthermore, the groove width Wg2 of the center main groove 22 is 9.0 mm, and the groove depth Hg2 of the center main groove 22 is 12.9 mm. Additionally, the tire ground contact width TW is 212 mm, the ground contact width Wb1 of the shoulder land portion 31 is 39.5 mm, and the ground contact widths Wb2, Wb3 of the center land portions 32, 33 are 31.0 mm and 32.0 mm. Moreover, the groove width Ws of the circumferential narrow groove 41 is 0.7 mm, and the groove depth Hs of the circumferential narrow groove 41 is 9.2 mm. In addition, the test tire of Example 16 has the configuration of FIG. 9, and is identical to the test tire of Example 1 except that the groove width Wg2 of the center main groove 22 is 4.6 mm, the tire ground contact width TW is 207 mm, and the ground contact width Wb1 of the shoulder land portion 31 is 41.4 mm.

In the test tire of Conventional Example, the number of waves having the zigzag shape of the circumferential narrow groove 41 is equal to the pitch number of the first lateral groove 42A in the test tire of Example 1 (see FIG. 12). Accordingly, the adjacent first lateral grooves 42A, 42A are connected by a set of a long portion and a short portion. Further, the lateral grooves 42A, 42B are arranged in a staggered manner in the tire circumferential direction, and alternately connect to the bend points of the circumferential narrow groove 41 having a zigzag shape. Furthermore, the adjacent lateral grooves 42A, 42B are arranged mutually offset in the tire circumferential direction. Additionally, the lateral grooves 42A, 42B of the adjacent center land portions 32, 33 are arranged overlapped with each other in the tire circumferential direction.

As can be seen from the test results, the test tires of Examples provide wet braking performance and uneven wear resistance performance in a compatible manner.

What is claimed is:
1. A tire, comprising:
a pair of shoulder main grooves and one or more center main grooves; and
a pair of shoulder land portions and two or more center land portions defined and formed by the shoulder main grooves and the center main grooves;
at least one center land portion of the center land portions comprising:
a circumferential narrow groove extending in a tire circumferential direction;
a first lateral groove opening to one edge portion of the center land portion at one end and connecting to the circumferential narrow groove at an other end; and a second lateral groove opening to an other edge portion of the center land portion at one end and connecting to the circumferential narrow groove at the other end;

the circumferential narrow groove having a zigzag shape formed by repeatedly connecting a first long portion, a first short portion, a second long portion, and a second short portion,
the first lateral groove connecting to the first long portion of the circumferential narrow groove having the zigzag shape, and
the second lateral groove connecting to the second long portion of the circumferential narrow groove having the zigzag shape.

2. The tire according to claim 1, wherein a groove width Ws of the circumferential narrow groove is in a range 0.1 mm≤Ws≤2.0 mm.

3. The tire according to claim 1, wherein an amplitude As1 of the zigzag shape in the first short portion with respect to an amplitude As2 of the zigzag shape in the second short portion is in a range 0.10≤As1/As2≤0.90.

4. The tire according to claim 1, wherein a maximum amplitude As of the zigzag shape with respect to a ground contact width Wb2 of the center land portion is in a range 0.05≤As/Wb2≤0.20.

5. The tire according to claim 1, wherein a pitch length Ps of the zigzag shape formed of the first long portion, the first short portion, the second long portion, and the second short portion with respect to a ground contact width Wb2 of the center land portion is in a range 0.50≤Ps/Wb2≤1.10.

6. The tire according to claim 1, wherein an inclination angle θs2B of the second short portion with respect to the tire circumferential direction with respect to an inclination angle θs2A of the first short portion is in a range 10 degrees≤θs2B−θs2A≤50 degrees.

7. The tire according to claim 1, wherein groove widths of the first and second lateral grooves are in a range of 0.1 mm or more and 2.0 mm or less.

8. The tire according to claim 1, wherein each of the first and second lateral grooves comprises an inclined portion inclined with respect to the tire circumferential direction, an inclination angle of the inclined portion is in a range of 40 degrees or more and 80 degrees or less, and the inclined portions of the first and second lateral grooves are inclined mutually in a same direction with respect to the tire circumferential direction.

9. The tire according to claim 8, wherein a groove depth H21 of the inclined portion with respect to a groove depth Hg1 of the shoulder main groove is in a range 0.05≤H21/Hg1≤0.15.

10. The tire according to claim 8, wherein the inclined portion of each of the first and second lateral grooves is inclined in an opposite direction with respect to the long portion of the circumferential narrow groove having the zigzag shape.

11. The tire according to claim 8, wherein an extension length D21 of the inclined portion in a tire width direction with respect to a ground contact width Wb2 of the center land portion is in a range 0.10≤D21/Wb2≤0.50.

12. The tire according to claim 8, wherein each of the first and second lateral grooves comprises an axial direction portion connecting the inclined portion to an edge portion of the center land portion, and an inclination angle of the axial direction portion with respect to the tire circumferential direction is in a range of 80 degrees or more and 110 degrees or less.

13. The tire according to claim 12, wherein an amplitude As1 of the zigzag shape in the first short portion with respect to an amplitude As2 of the zigzag shape in the second short portion is in a range 0.10≤As1/As2≤0.90.

14. The tire according to claim 13, wherein a maximum amplitude As of the zigzag shape with respect to a ground contact width Wb2 of the center land portion is in a range $0.05 \leq As/Wb2 \leq 0.20$.

15. The tire according to claim 14, wherein a pitch length Ps of the zigzag shape formed of the first long portion, the first short portion, the second long portion, and the second short portion with respect to a ground contact width Wb2 of the center land portion is in a range $0.50 \leq Ps/Wb2 \leq 1.10$.

16. The tire according to claim 15, wherein an inclination angle θs2B of the second short portion with respect to the tire circumferential direction with respect to an inclination angle θs2A of the first short portion is in a range $10 \text{ degrees} \leq θs2B - θs2A \leq 50 \text{ degrees}$.

17. The tire according to claim 16, wherein groove widths of the first and second lateral grooves are in a range of 0.1 mm or more and 2.0 mm or less.

18. The tire according to claim 17, wherein each of the first and second lateral grooves comprises an inclined portion inclined with respect to the tire circumferential direction, an inclination angle of the inclined portion is in a range of 40 degrees or more and 80 degrees or less, and the inclined portions of the first and second lateral grooves are inclined mutually in a same direction with respect to the tire circumferential direction.

19. The tire according to claim 18, wherein a groove depth H21 of the inclined portion with respect to a groove depth Hg1 of the shoulder main groove is in a range $0.05 \leq H21/Hg1 \leq 0.15$.

20. The tire according to claim 19, wherein:
the inclined portion of each of the first and second lateral grooves is inclined in an opposite direction with respect to the long portion of the circumferential narrow groove having the zigzag shape;
an extension length D21 of the inclined portion in a tire width direction with respect to a ground contact width Wb2 of the center land portion is in a range $0.10 \leq D21/Wb2 \leq 0.50$; and,
each of the first and second lateral grooves comprises an axial direction portion connecting the inclined portion to an edge portion of the center land portion, and an inclination angle of the axial direction portion with respect to the tire circumferential direction is in a range of 80 degrees or more and 110 degrees or less.

* * * * *